US010807417B2

(12) United States Patent
Dayet

(10) Patent No.: US 10,807,417 B2
(45) Date of Patent: Oct. 20, 2020

(54) HEAVY VEHICLE TIRE TREAD WITH IMPROVEMENT TO RUNNING NOISE

(71) Applicant: COMPAGNIE GENERALE DES ETABLISSEMENTS MICHELIN, Clermont-Ferrand (FR)

(72) Inventor: Patrick Dayet, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 271 days.

(21) Appl. No.: 15/745,611

(22) PCT Filed: Jul. 19, 2016

(86) PCT No.: PCT/EP2016/067171
§ 371 (c)(1),
(2) Date: Jan. 17, 2018

(87) PCT Pub. No.: WO2017/016931
PCT Pub. Date: Feb. 2, 2017

(65) Prior Publication Data
US 2018/0207990 A1 Jul. 26, 2018

(30) Foreign Application Priority Data
Jul. 24, 2015 (FR) ..................................... 15 57039

(51) Int. Cl.
*B60C 11/03* (2006.01)
*B60C 11/12* (2006.01)

(52) U.S. Cl.
CPC ...... *B60C 11/0323* (2013.01); *B60C 11/0302* (2013.01); *B60C 11/0318* (2013.01);
(Continued)

(58) Field of Classification Search
CPC ............. B60C 11/0323; B60C 11/1281; B60C 11/0302; B60C 11/032; B60C 11/0318; B60C 2011/0358; B60C 2200/06
See application file for complete search history.

(56) References Cited

U.S. PATENT DOCUMENTS

2008/0149237 A1 6/2008 Cambron et al.
2015/0059943 A1* 3/2015 Radulescu .............. B60C 11/04
152/209.17
(Continued)

FOREIGN PATENT DOCUMENTS

EP 1935671 A2 6/2008
FR 2993500 A1 * 1/2014 .......... B60C 11/0311
(Continued)

*Primary Examiner* — Steven D Maki
*Assistant Examiner* — Cedrick S Williams
(74) *Attorney, Agent, or Firm* — Dickinson Wright PLLC; Steven Hurles

(57) ABSTRACT

The tread has main grooves that delimit a central region of a width comprised between 15 and 25% of a total width W and that define the wearable thickness of the tread. The tread also has lateral regions on each side of the central region, and the lateral regions are divided into raised elements. The elongate elements are delimited by oblique secondary grooves which are inclined by a mean angle of between 35 degrees and 55 degrees with respect to the circumferential direction and have a depth P5 which is between 30% and 60% of the depth P. Each elongate raised element has an oblique cut which divides the element into two elongate element halves, and each oblique cut is formed by a sipe extended by an internal canal. The internal canal forms a new groove once the tread is partially worn before the oblique secondary grooves completely disappear.

6 Claims, 2 Drawing Sheets

(52) U.S. Cl.
CPC ... *B60C 11/1281* (2013.01); *B60C 2011/0353* (2013.01); *B60C 2011/0358* (2013.01); *B60C 2011/0388* (2013.01); *B60C 2011/1209* (2013.01); *B60C 2200/06* (2013.01)

(56) References Cited

U.S. PATENT DOCUMENTS

2015/0183274 A1* 7/2015 Felder ................. B60C 11/0306
                                                       152/209.25
2016/0297252 A1   10/2016  Cambon et al.
2016/0318348 A1*  11/2016  Cambon ............. B60C 11/1307

FOREIGN PATENT DOCUMENTS

FR          3014022 A1    6/2015
FR          3014746 A1 *  6/2015  ......... B60C 11/0323

\* cited by examiner

HEAVY VEHICLE TIRE TREAD WITH IMPROVEMENT TO RUNNING NOISE

CROSS-REFERENCE TO RELATED APPLICATION

The present application claims priority to PCT International Patent Application Serial No. PCT/EP2016/067171, filed Jul. 19, 2016 entitled "HEAVY VEHICLE TIRE TREAD WITH IMPROVEMENT TO RUNNING NOISE," which claims the benefit of FR Patent Application Serial No. 1557039, filed Jul. 24, 2015.

BACKGROUND OF THE INVENTION

1. Field of the Invention

The present disclosure relates to treads for heavy vehicle tires and more particularly to the tread pattern designs of these treads and to the tires provided with such treads, of which the performance, in terms of the noise emitted during running, is improved while at the same time maintaining a high level of wet grip performance.

2. Related Art

As is known, tires for heavy vehicles are provided with a tread, which, via its tread surface, is intended to come into contact with the roadway during running. This same tread must provide the vehicle with the grip performance is essential to driving safety, whether this be in the dry or in the wet or even on a roadway covered with snow.

In order to improve this roadholding and directional-stability performance whatever the running conditions, it is known practice to provide the tread surface with a tread pattern design This tread pattern design, in addition to having an aesthetic appeal, also has a technical aspect and as a general rule is made up of a plurality of cuts made during the molding of the tread or indeed during the molding of the tire. What is meant here by a cut is any kind of cavity that may take the form of a groove, of a sipe, or more generally any type of void that generates edge corners and a volume available to collect any water that might be present on the roadway in wet weather.

As a tire runs along a roadway, the elements of the tread come into contact with the said roadway and, because of this repetitive contact, generate a running noise which may be broken down into a number of harmonics, some of them being a direct function of the design of the tread pattern.

What is meant here by the design of the tread pattern is the arrangement of the raised elements (such as the tread blocks and ribs) of material delimited by grooves and forming repetitive patterns as the wheel turns.

In order to limit running noise, it is known practice, notably in the case of tires intended for passenger vehicles, to have the length of the basic patterns of the tread pattern design vary around the wheel; this technique referred to as variable-pitch (multi-pitch) consisting in using in sequencer a succession of patterns of different circumferential lengths.

In the field of heavy vehicle tires, this technique is not as widely employed and the tread pattern designs used are generally mono-pitch for which the noise is characterized by the harmonics associated with the design of the tread pattern.

SUMMARY OF THE INVENTION AND ADVANTAGES

The objective of the present disclosure is to reduce the amplitude of the harmonics by reducing the amplitude of the excitation associated with the design of the tread pattern, namely the phenomena whereby the raised elements and the roadway on which the tire is running come into contact with one another.

The noise emitted by a heavy vehicle tire is characterized by a mechanical excitation power transmitted to the tire by impact of the tread pattern elements as they enter the contact patch in which the tire is in contact with the roadway.

Put very simply, the mechanisms involved as the leading edge of a tread pattern element enters the contact patch and the time for which this event occurs can be represented in the form of the spectrum of a signal or of a single rectangular pulse of period T and of pulse width aT, this pulse width representing the contact time for the entirety of a leading edge of a raised element of the tread.

The time-domain and frequency-domain depictions of such a signal are shown schematically in FIGS. 1A and 1B of the present document.

Definitions

The equatorial mid-plane of a tire; this is a plane perpendicular to the axis of rotation of the tire and passing through the points of the tire that are radially farthest from the said axis.

A radial direction is understood to mean in the present document a direction which is perpendicular to the axis of rotation of the tire (this direction corresponds to the direction of the thickness of the tread).

A transverse or axial direction is understood to mean a direction parallel to the axis of rotation of the tire.

A circumferential direction is understood to mean a direction tangential to any circle centered on the axis of rotation. This direction is perpendicular both to the axial direction and to a radial direction.

The total thickness of a tread is measured, on the equatorial plane of the tire provided with this tread, between the tread surface and the radially outermost part of the crown reinforcement when the tire is new.

A tread has a maximum thickness of material that can be worn away during running, this maximum wearable thickness of material being less than the total thickness of the tread.

The usual running conditions of the tire or use conditions are those which are defined by the E.T.R.T.O. standard for running in Europe; these use conditions specify the reference inflation pressure corresponding to the load-bearing capability of the tire as indicated by its load index and speed rating. These use conditions may also be referred to as "nominal conditions" or "working conditions".

A cut generically denotes either a groove or a sipe and corresponds to the space delimited by walls of material that face one another and are at a non-zero distance from one another (referred to as the "width of the cut"). It is precisely this distance that differentiates a sipe from a groove: in the case of a sipe, this distance is suitable for allowing the opposing walls that delimit said sipe to come into at least partial contact at least when the sipe enters the contact patch in which the tire is in contact with the roadway. In the case of a groove, the walls of this groove cannot come into contact with one another under the usual running conditions as defined for example by the E.R.T.O.

The present disclosure relates to a tread pattern design for the tread of a heavy vehicle tire which appreciably improves the level of running noise while at the same time maintaining good wear and grip performance, regardless of the degree of wear.

The tread according to the disclosure comprises when new a tread surface intended to come into contact with a roadway, this tread having a width W.

This tread furthermore comprises:
a mid-plane that divides the tread into two halves of equal width,
two main grooves of circumferential overall orientation delimiting a central region of a width comprised between 15 and 25% of the total width W of the tread, these main grooves of circumferential overall orientation having a depth P substantially defining the wearable thickness of the tread,
lateral regions on each side of the central region, each of these lateral regions being divided into a plurality of elongate raised elements comprising long sides and short sides, these elements being delimited by oblique grooves opening into the circumferential main grooves and inclined by a mean angle of between 35 degrees and 55 degrees—this angle being measured with respect to the circumferential direction.

The oblique secondary grooves have a depth P5 comprised between 30% and 60% of the depth P of the main grooves of circumferential overall orientation and in that each elongate raised element of the lateral regions comprises an oblique additional cut running parallel to the oblique grooves delimiting this element and dividing the element into two elongate element halves, each oblique additional cut opening onto the short sides of the element, and in that each oblique additional cut has a total depth at least equal to 75% of the depth of the circumferential main grooves and is formed—progressing from the surface of the tread when the tire is new toward the inside of the tread—by a sipe extended by an internal canal intended to form a new groove once the tread is partially worn at the latest before the oblique secondary grooves completely disappear, this internal canal having a mean width at least equal to the mean width of the oblique grooves, each oblique groove and each oblique additional cut of an elongate raised element being extended in the central region of the tread by an oblique cut formed of a sipe extending into the thickness of the tread in the form of an internal canal, this oblique cut formed in the central region maintaining the same orientation as the oblique grooves of the lateral regions and doing so as far as the mid-plane.

By virtue of a tread according to the disclosure, it is possible at once to increase each pulse time aT of the raised elements entering the contact patch, and thus to decrease the frequency of the damping signal, minimizing the frequencies that are higher than it while at the same time maintaining good performance in terms of wet grip, irrespective of the level of tread wear.

The impulse time is modified here through the choice of an inclination of the raised elements with respect to the circumferential direction, something which has the effect of increasing the length of their leading edge and therefore the total time taken coming into contact with the roadway in the contact patch. What is meant by the leading edge or edge corner is the edge corner of a raised element that is first to come into contact with the roadway in the contact patch during running. By contrast, the edge or edge corner that comes into contact after the leading-edge corner is referred to as the trailing edge corner of the element.

Such an orientation of the raised elements makes the tread more sensitive to wear of the "sawtooth" type, which is counterbalanced by a reduction in the height of the raised elements in comparison with the usual height of raised elements on tires for heavy vehicles. The fact that the elongate elements particularly, in the new state, have a limited height lower than the height of the central region makes it possible to reduce the impact that the inclination A chosen for these elements has on wear.

Moreover, the wet grip performance is maintained by virtue of the presence of a tread pattern design that evolves with wear, which is able to generate the appearance of new grooves following partial wear.

The disclosure makes it possible to shift the balance between running noise performance, wet grip performance and durability because whatever the wear level, the level of grip is optimal.

Advantageously, and in order to reduce running noise still further, the oblique grooves of one lateral region of the tread are offset circumferentially with respect to the oblique grooves of the other lateral region.

In an advantageous alternative form of the disclosure, the oblique grooves of the lateral parts are oriented so as to create a directional tread pattern design, that is to say one having a preferential direction of running.

According to another alternative form of the disclosure, each elongate raised element further comprises a cut of circumferential overall orientation, this cut being formed of a sipe extended into the thickness by a canal intended to form a new circumferential groove once the groove is partially worn at the latest before the oblique secondary grooves completely disappear.

Advantageously, each elongate raised element has short sides of a length comprised between 50 and 60 mm (millimeters).

The mean angle A of inclination of the oblique grooves and of the oblique additional cuts expressed in degrees is chosen to satisfy the following inequality:

$$A \geq \arctan\left(\frac{1}{n} \times \frac{D}{WL \times N}\right) \times \frac{180}{\pi}$$

Where:
D is the length traveled by a complete revolution of the tire, measured during the running under its conditions of use (pressure and load);
WL is the axial width of the lateral parts (this axial width is equal to the length projected onto the axial direction of the lengths of the leading-edge corners of the oblique raised elements);
N is the number of oblique secondary grooves in one revolution of the wheel;
n is the harmonic of the noise that is to be reduced or eliminated. (n the values 1, 2, 3, . . . ).

BRIEF DESCRIPTION OF THE DRAWINGS

Further features and advantages of the disclosure will become apparent from the following description with reference to the appended drawings which show, by way of nonlimiting examples, embodiments of the subject matter of the disclosure.

DETAILED DESCRIPTION OF THE ENABLING EMBODIMENTS

To make the figures easier to understand, identical reference signs have been used to denote variants of the disclosure where these reference signs refer to elements of the same kind, whether structurally or functionally.

Figure 1:
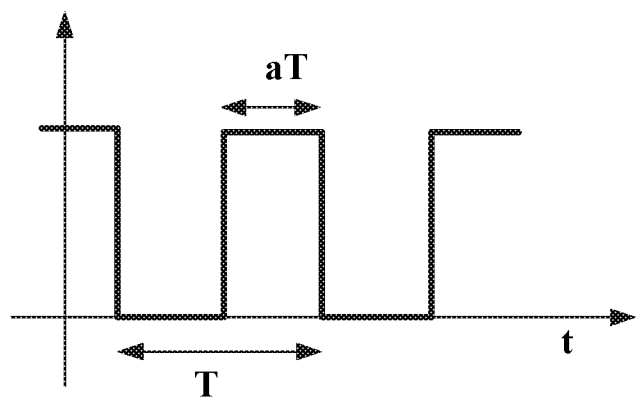
FIGS. 1 and 2 respectively show a time-domain and a frequency-domain depiction of a signal corresponding to the noise emitted by a repeating pattern of a heavy vehicle tire tread during running.
Figure 2:
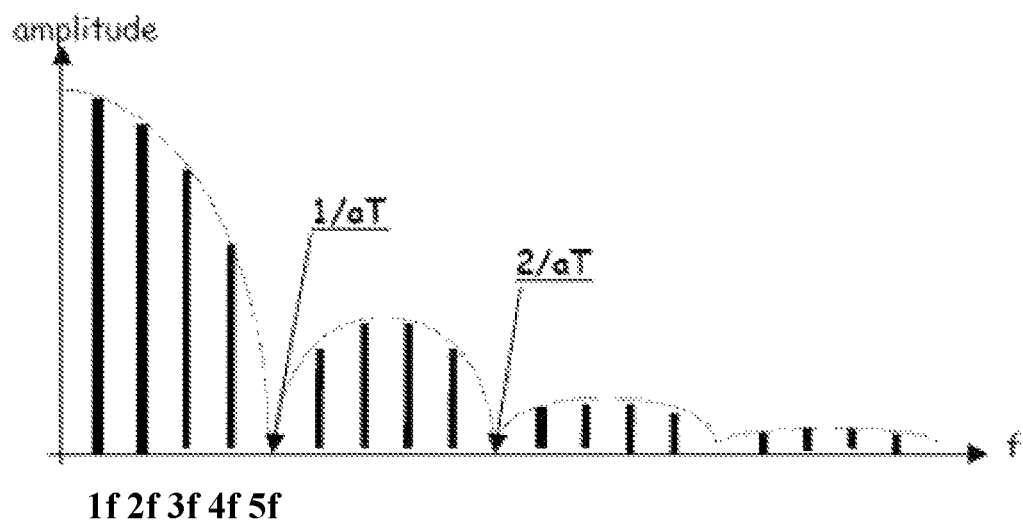

FIG. 1 shows a time-domain schematic depiction and FIG. 2 shows a frequency-domain depiction of the acoustic signal corresponding to the noise emitted by a repeating pattern of a heavy vehicle tire tread during running. Put very simply, the mechanisms involved as the leading edge of a tread element comes into contact and the time for which this contact occurs can be represented in the form of a spectrum of a single rectangular pulse of period T and of pulse width or duration aT. The frequency spectrum comprises spectral lines at the frequencies Qf, where Q adopts the integer values 1, 2, 3, . . . and the amplitude of which evolves with the frequency f as a function of the type.

$$\frac{\sin\theta}{\theta}$$

The envelope of this spectrum passes through zero at the frequencies that are multiples of the inverses of the pulse width $$\frac{1}{aT}, \frac{2}{aT}, \ldots$$

By increasing the pulse width time aT, it is possible to reduce the frequency of the damping signal and thus minimize the frequencies that are higher than it. This increasing of the pulse width time is obtained using the tread pattern according to the invention which is described with the support of FIG. 2 et seq.

Figure 3:
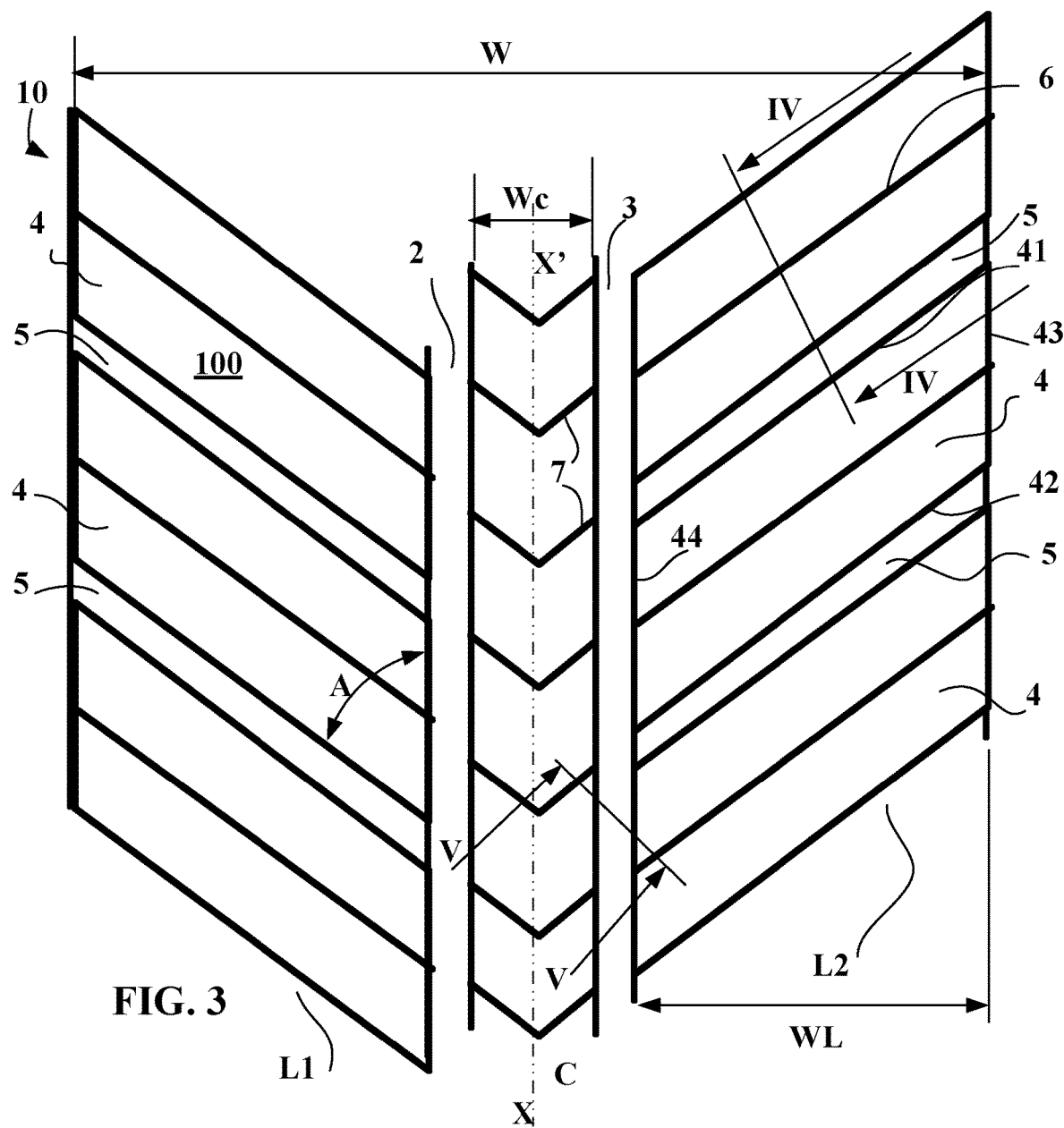
FIG. 3 shows a partial view of a tread of a heavy vehicle tire according to the disclosure.

FIG. 3 shows a partial view of an external surface of an example of a tread 10 for a heavy vehicle tire according to the invention, this tire being of size 315/70 R 22.5.

This tread 10 comprises a tread surface 100 and a tread pattern design determined so as to allow an optimum level of performance to be achieved when running on a wet roadway while at the same time appreciably reducing the noise emitted during running. The tread surface is formed by the contact faces of the tread pattern design which are intended to come into contact with a roadway during running.

This tread comprises two main grooves of circumferential overall orientation 2, 3 delimiting a central part C extending on each side of the equatorial mid-plane (the plane that divides the tire provided with the said tread into two equal halves). The central part has an axial width We equal in this instance to 46 mm. This equatorial mid-plane is indicated by its line in the plane of FIG. 2 using the line XX'.

The circumferential main grooves 2, 3 have a mean width equal to 5 mm and a depth equal to 14 mm (this depth corresponding to the thickness of material that can be worn away before the tire has to be changed or its tread renewed by retreading). The width of the central part C is, in this instance, equal to 18% (the width W of the tread is equal to 254 mm for the tire size chosen).

The tread comprises lateral regions L1, L2, situated on each side of the central region C, each of these lateral regions, being divided into a plurality of elongate raised elements 4 comprising long sides 41, 42 and short sides 43, 44, these elongate raised elements 4 being delimited by oblique secondary grooves 5 opening into the circumferential main grooves 2, 3 and inclined by a mean angle A equal, in this instance, to 45 degrees—this angle being measured with respect to the circumferential direction parallel to the line XX'. Thus, the long sides 41, 42 of the oblique elements are inclined by 45 degrees with respect to the circumferential direction.

This angle A is determined so as to satisfy the following inequality:

$$A \geq \arctan\left(\frac{1}{n} \times \frac{D}{WL \times N}\right) \times \frac{180}{\pi}$$

Where:
D=3152 mm. D is the length traveled by a complete revolution of the tire of size 315/70 R 22.5, measured during running with the tire subjected to its usage conditions of pressure and load as defined in the E.R.T.O. standards.
WL=100 mm. WL is equal to the axial width of the lateral parts,
N is the number of oblique secondary grooves in one revolution of the wheel, in this instance this number is equal to 48,
n is the harmonic of the noise that is to be reduced or eliminated; in this instance, n=1.

By calculation, the angle A needs to be greater than 33.3 degrees.

The oblique secondary grooves 5 delimiting the elongate raised elements 4 have a depth equal in this instance to 55% of the depth of the circumferential main grooves 2, 3.

Furthermore, and on each elongate raised element 4 of the lateral regions there is formed an oblique additional cut 6 that runs parallel to the oblique secondary grooves 5 delimiting this elongate raised element and divides the element into two elongate element halves, each oblique additional cut 6 opening onto the short sides 43, 44 of the raised element 4. This oblique additional cut 6 has a total depth equal to the depth of the circumferential main grooves and is made up—starting from the tread surface when the tire is new and progressing toward the inside of the tread—of a sipe 61 of small width (which means to say that allows the opposing faces of material thereof to come into contact with one another when in the contact patch in which the tire is in contact with the roadway), this sipe 61 being extended by an internal canal 62 intended to form a new groove after partial tread wear representing 45% of the depth P of the circumferential main grooves 2, 3.

This internal canal 62 has a mean width at least equal to the mean width of the oblique secondary grooves 5, each oblique secondary groove 5 and each oblique additional cut 6 of an elongate raised element being extended transversely into the central region of the tread by an oblique cut 7 made up, starting from the tread surface, of a sipe 71 extended into the thickness of the tread by an internal canal 72, this oblique cut 7 formed in the central region C keeping the same orientation as the oblique secondary grooves 5 of the lateral regions and doing so as far as the mid-plane XX'. Dimensionally, these cuts 7 are identical to the cuts 6 formed in the lateral parts.

Figure 4:
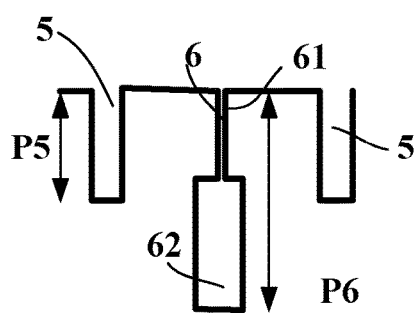
FIG. 4 shows a view in cross section of the tread shown in FIG. 3, on a plane of section the line of which with shown with the line IV-IV in FIG. 3.

FIG. 4 shows a cross section in a plane of which the line in FIG. 2 is indicated by the line IV-IV. This cross section shows an elongate element 4 delimited by two oblique secondary grooves 5 of the same depth P5, this elongate element 4 being cut into two by a cut 6 formed by a sipe 61 opening onto the tread surface 100 extended by a canal having a width equal to the width of the secondary grooves. The canal 62 opens to form a new groove when part wear reaches 55% of the depth P of the circumferential main grooves. The total depth P6 of the cut 6 is equal in the alternative form described to the depth P of the circumferential main grooves.

Figure 5:
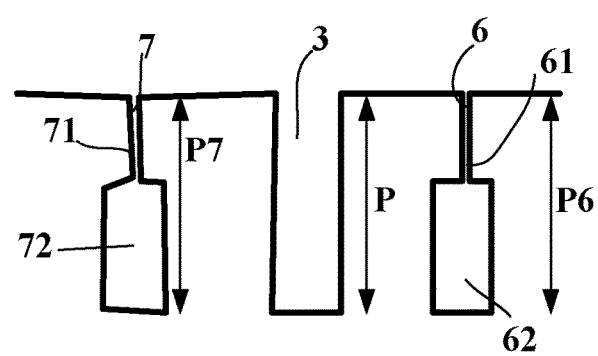
FIG. 5 shows a view in cross section of the tread shown in FIG. 3, on a plane of section the line of which with shown with the line V-V in FIG. 3.

FIG. 5 shows a cross section in a plane of which the line in FIG. 2 is indicated by the line V-V. This cross section shows the central part C provided with a cut 7 opening onto the tread surface 100, this cut comprising a sipe 71 extended by a canal 72 intended to form a new oblique groove following a partial wear. This cross section shows that the cut 7 has a depth P7 which is equal to the depth P of the circumferential main groove 5.

In the example described, the tread pattern design is directional, which means to say dictates a preferential direction of rotation when the tire provided with the tread is mounted on a heavy vehicle. It is advantageous for the edge corners of the elongate oblique elements, when new, to enter the contact patch via their points closest to the mid-plane (as depicted in FIG. 2).

In an alternative form of the disclosure; the elongate raised elements are divided in the axial direction (which means to say direction parallel to the axis of rotation of the tire) by a sipe of small width (which means to say that allows the opposing faces of material thereof to come into contact with one another when in the contact patch in which the tire is in contact with the roadway), this sipe opening onto the tread surface when the tire is new and extending into the tread as a widened part that forms a hidden canal. This hidden canal, which is intended to form a new groove when the tread becomes part worn, extending into the thickness of the tread down to the depth of the main grooves. In this alternative form, the depths of the oblique secondary grooves may differ according to whether or not they are close to the equatorial mid-plane. Likewise, the inclination A of the leading-edge corners which satisfy the inequality relationship as claimed may be differentiated according to whether they lie close to the mid-plane or close to the edges of the tread.

The disclosure is not restricted to the examples described and various modifications can be made thereto without departing from the scope as defined in the claims.

The invention claimed is:

1. A tread for a heavy vehicle tire, this tread having, when new, a tread surface intended to come into contact with a roadway, this tread having a width W, this tread comprising:
   a mid-plane that divides the tread into two halves of equal width,
   two main grooves of circumferential overall orientation delimiting a central region (C) of a width comprised between 15 and 25% of the total width W of the tread, these main grooves having a depth P substantially defining the wearable thickness of the tread,
   lateral regions (L1, L2) on each side of the central region (C), each of these lateral regions being divided into a plurality of elongate raised elements comprising long sides and short sides, these elongate elements being delimited by oblique secondary grooves opening into the circumferential main grooves, these oblique secondary grooves being inclined by a mean angle (A) of between 35 degrees and 55 degrees—this angle being measured with respect to the circumferential direction,
   wherein these oblique secondary grooves have a depth P5 comprised between 30% and 60% of the depth P of the grooves of circumferential overall orientation, and in that each elongate raised element of the lateral regions (L1, L2) comprises an oblique cut running parallel to the oblique grooves delimiting this elongate raised element and dividing this element into two elongate element halves, each oblique cut opening onto the short sides of the element, and
   wherein each oblique cut has a total depth at least equal to 75% of the depth of the circumferential main grooves and is formed—progressing from the surface of the tread when the tire is new toward the inside of the tread—by a sipe, the sipe extending inward from the tread surface when new, extended by an internal canal, this internal canal being intended to form a new groove once the tread is partially worn at the latest before the oblique secondary grooves completely disappear, this internal canal having a mean width at least equal to the mean width of the oblique secondary grooves, each oblique secondary groove and each oblique cut of an elongate raised element being extended in the central region (C) of the tread by an additional cut formed of a sipe extending into the thickness of the tread in the form of an internal canal, this additional cut formed in the central region (C) maintaining the same orientation as the oblique grooves of each lateral region (L1, L2) and doing so as far as the equatorial mid-plane.

2. The tread according to claim 1 wherein the oblique grooves of one lateral region of the tread are offset circumferentially with respect to the oblique grooves of the other lateral region.

3. The tread according to claim 1 wherein the oblique grooves of the lateral parts are oriented so as to create a directional pattern.

4. The tread according to claim 1 wherein each elongate raised element further comprises a cut of circumferential overall orientation, this cut being formed of a sipe extended into the thickness by a canal intended to form a new groove at the latest before the oblique secondary grooves completely disappear.

5. The tread according to claim 1 wherein each elongate raised element has short sides of a length comprised between 50 and 60 mm.

6. The tread according to claim 1 wherein the following inequality is satisfied:
   in which A is the mean angle of inclination of the oblique grooves and of the oblique cuts, expressed in degrees, D is the length traveled by a complete revolution of the tire, measured during the running under its conditions of use, WL is the axial width of the lateral parts, N is the number of oblique grooves in one revolution of the wheel, and n is the harmonic of the noise that is to be eliminated.

* * * * *